US008507793B2

(12) United States Patent
Kasahara et al.

(10) Patent No.: US 8,507,793 B2
(45) Date of Patent: Aug. 13, 2013

(54) PLASMA DISPLAY PANEL AND CHAMBER FOR MANUFACTURING PLASMA DISPLAY PANEL

(75) Inventors: Shigeo Kasahara, Kobe (JP); Akira Tokai, Kakogawa (JP); Manabu Inoue, Ibaraki (JP); Naoki Kosugi, Kyoto (JP); Toshiaki Yoshitani, Ibaraki (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 13/027,516

(22) Filed: Feb. 15, 2011

(65) Prior Publication Data

US 2011/0220384 A1 Sep. 15, 2011

(30) Foreign Application Priority Data

Mar. 9, 2010 (JP) ................................ 2010-051972

(51) Int. Cl.
*H01J 5/00* (2006.01)
*C03B 5/16* (2006.01)

(52) U.S. Cl.
USPC .................... 174/50.5; 174/50.61; 174/50.63; 65/34

(58) Field of Classification Search
USPC ................. 174/50.5, 50, 50.51, 50.52, 50.53, 174/50.54, 50.55, 50.56, 50.57, 50.58, 50.59, 174/50.6, 50.61, 50.62, 50.63, 50.64; 65/34
See application file for complete search history.

(56) References Cited

U.S. PATENT DOCUMENTS

| | | | | |
|---|---|---|---|---|
| 7,906,725 | B2 * | 3/2011 | Shimoi et al. | 174/50.5 |
| 2009/0205849 | A1 * | 8/2009 | Kimura et al. | 174/50.5 |
| 2009/0260845 | A1 * | 10/2009 | Kai et al. | 174/50.5 |

FOREIGN PATENT DOCUMENTS

| | | | |
|---|---|---|---|
| JP | 2005-116299 | | 4/2005 |
| JP | 2005116299 A | * | 4/2005 |
| KR | 10-2006-0131574 | | 12/2006 |
| KR | 1020060131574 | * | 12/2006 |
| WO | WO 2010061418 A1 | * | 6/2010 |

* cited by examiner

*Primary Examiner* — Hoa C Nguyen
*Assistant Examiner* — Binh Tran
(74) *Attorney, Agent, or Firm* — Antonelli, Terry, Stout & Kraus, LLP.

(57) ABSTRACT

A structure of a panel which can be thinned down to about a panel thickness of a PDP and a manufacturing method thereof are provided. A gas filling hole is provided to a surface of a rear glass substrate of a PDP, the surface coming in contact with a front glass substrate of the PDP. Vacuuming and filling of a discharge gas are performed through the gas filling hole. After filling of the discharge gas, a mechanism for lifting solder iron up and down and supplying solder provided inside a chamber inserts a tip of an ultrasonic soldering iron into the gas filling hole to start supplying a solder which is a material for a plug sealant. When a series of forming steps of the plug sealant are finished, the ultrasonic soldering iron is retreated before the solder is solidified to finish formation of the plug sealant.

3 Claims, 7 Drawing Sheets

PLASMA DISPLAY PANEL AND CHAMBER FOR MANUFACTURING PLASMA DISPLAY PANEL

CROSS-REFERENCE TO RELATED APPLICATION

The present application claims priority from Japanese Patent Application No. 2010-051972 filed on Mar. 9, 2010, the content of which is hereby incorporated by reference into this application.

TECHNICAL FIELD OF THE INVENTION

The present invention relates to a structure of a plasma display panel used as a display device, and a chamber for manufacturing the same.

BACKGROUND OF THE INVENTION

Plasma display panels (PDPs) are products which draw attention as full-color display devices suitable for large screens and which have spread widely. In an AC-type PDP of a three-electrode surface-discharge type, a plurality of sustain electrode pairs for generating surface discharge on a glass substrate on a display side (front glass substrate) are formed of ITO or the like. Address electrodes formed to be perpendicular to the sustain electrode pairs as viewed from a display area and a phosphor layer covering the address electrodes are formed on a glass substrate on a rear side (rear glass substrate).

The front glass substrate and the rear glass substrate are sealed with a low-melting-point glass seal, where, after a discharge gas is filled from a gas inlet pipe (gas filling pipe) provided on the rear glass substrate, the gas inlet pipe is sealed and cut (see #A in FIG. 9).

Japanese Patent Application Laid-Open Publication No. 2005-303065 describes means for performing air-tight welding under an inert gas atmosphere to manufacture a vacuum package.

Japanese Patent Application Laid-Open Publication No. 2004-296308 describes the effect that an exhaust pipe, which has its one end embedded into a hole extending through a rear sheet glass, is provided and pressure reduction is performed via the exhaust pipe.

Japanese Patent Application Laid-Open Publication No. 2000-149791 discloses means for attaching an exhaust pipe for closing an exhaust hole upon airtight sealing of a flat display device and closing the exhaust hole after exhausting from the exhaust pipe. A similar description is included in Japanese Patent Application Laid-Open Publication No. H11-240739.

Japanese Patent Application Laid-Open Publication No. H11-326037 describes an infrared detector manufactured by arranging a getter in a clearance after vacuum has been achieved via a through-hole.

SUMMARY OF THE INVENTION

Meanwhile, each of the techniques described in the above-mentioned Patent Documents has problems.

In the technique described in Japanese Patent Application Laid-Open Publication No. 2005-303065, since an opening is provided on a side of the package, it is difficult to use the technique in a PDP having a structure in which the front glass substrate and the rear glass substrate are attached to each other.

In the technique described in Japanese Patent Application Laid-Open Publication No. 2004-296308, one end of the exhaust pipe protruded from the rear glass substrate is sealed. Therefore, there is a problem that the thickness of the PDP is constrained according to the length of the exhaust pipe.

In the techniques described in Japanese Patent Application Laid-Open Publication No. 2000-149791 and Japanese Patent Application Laid-Open Publication No. H11-240739, since joining using a fritted glass or the like is performed upon attaching an exhaust pipe which has no relationship with manufacture of the PDP, there is such a problem that the number of manufacturing steps increases.

Even in the technique described in Japanese Patent Application Laid-Open Publication No. H11-326037, since a vacuum-sealing solder for sealing is protruded from the rear glass substrate, there is a problem similar to that described in Japanese Patent Application Laid-Open Publication No. 2004-296308.

A preferred aim of the present invention is to provide a structure of a panel that can be thinned down to about a panel thickness of the PDP and a manufacturing method of the panel.

The above and other preferred aims and novel characteristics of the present invention will be apparent from the description of the present specification and the accompanying drawings.

The typical ones of the inventions disclosed in the present application will be briefly described as follows.

A plasma display panel according to a typical embodiment of the present invention comprises a front glass substrate and a rear glass substrate, the plasma display panel sealing a discharge gas in between the front glass substrate and the rear glass substrate, wherein a hole for filling of the discharge gas is provided in the front glass substrate or the rear glass substrate, and a plug sealant is attached between the front glass substrate and the rear glass substrate in a sealing manner so as to prevent entry of the atmosphere from the hole.

The plasma display panel can be configured such that the plug sealant is not protruded from an outer surface of the front glass substrate or the rear glass substrate.

Further, the plasma display panel can be configured such that the plug sealant is made of a solder that is solidified/melted at a temperature equal to or less than a sealing temperature of a seal or an activation temperature of a protective film.

The plasma display panel can be configured such that a bank is provided on a face of the front glass substrate or the rear glass substrate through which the discharge gas is filled.

The plasma display panel can be configured such that the bank is for preventing leakage of the sealant in a display region of the plasma display panel.

A plasma display panel according to another typical embodiment of the present invention includes a front glass substrate, a rear glass substrate, and a seal material for sealing a discharge gas in between the front glass substrate and the rear glass substrate, wherein a groove for filling the discharge gas is provided to the seal material, and a plug sealant is attached between the front glass substrate and the rear glass substrate in a sealing manner so as to prevent entry of the atmosphere from the groove.

A chamber for manufacturing a plasma display panel according to still another typical embodiment of the present invention, the plasma display panel comprising a front glass substrate and a rear glass substrate, discharge gas being sealed in between the front glass substrate and the rear glass substrate, wherein a hole for filling the discharge gas is provided in the front glass substrate or the rear glass substrate, and the chamber for manufacturing the plasma display panel includes a mechanism for exhausting, filling, and recovering discharge gas that performs vacuuming from the hole and filling of the discharge gas; and a mechanism for lifting soldering iron up and down and supplying solder that introduces a solder into the hole and heats the same to form a sealant.

Such a configuration can be used that the a mechanism for lifting soldering iron up and down and supplying solder of the chamber for manufacturing the plasma display panel includes an ultrasonic soldering iron, a partial or whole diameter of a heating portion of the ultrasonic soldering iron is made smaller than an inner diameter of the hole, and the mechanism for lifting soldering iron up and down and supplying solder may insert the heating portion of the ultrasonic soldering iron into the hole to supply the solder.

According to the PDP of the present invention, a gas filling pipe or an exhausting pipe becomes unnecessary and thus a thickness of the panel can be set at a thickness of the front glass substrate, the rear glass substrate, and a low melting point glass seal for sealing them.

Further, since an exhausting pipe which is not related to the structure of the PDP and a step/equipment for mounting the exhausting pipe become unnecessary, a cost reduction can be expected.

Furthermore, it is not necessarily required to provide a hole for exhausting/filling gas on the rear glass substrate, and thus a degree of freedom for panel design is improved.

BRIEF DESCRIPTIONS OF THE DRAWINGS

DESCRIPTIONS OF THE PREFERRED EMBODIMENTS

Hereinafter, embodiments of the present invention will be described with reference to the attached drawings.

First Embodiment

Figure 1:
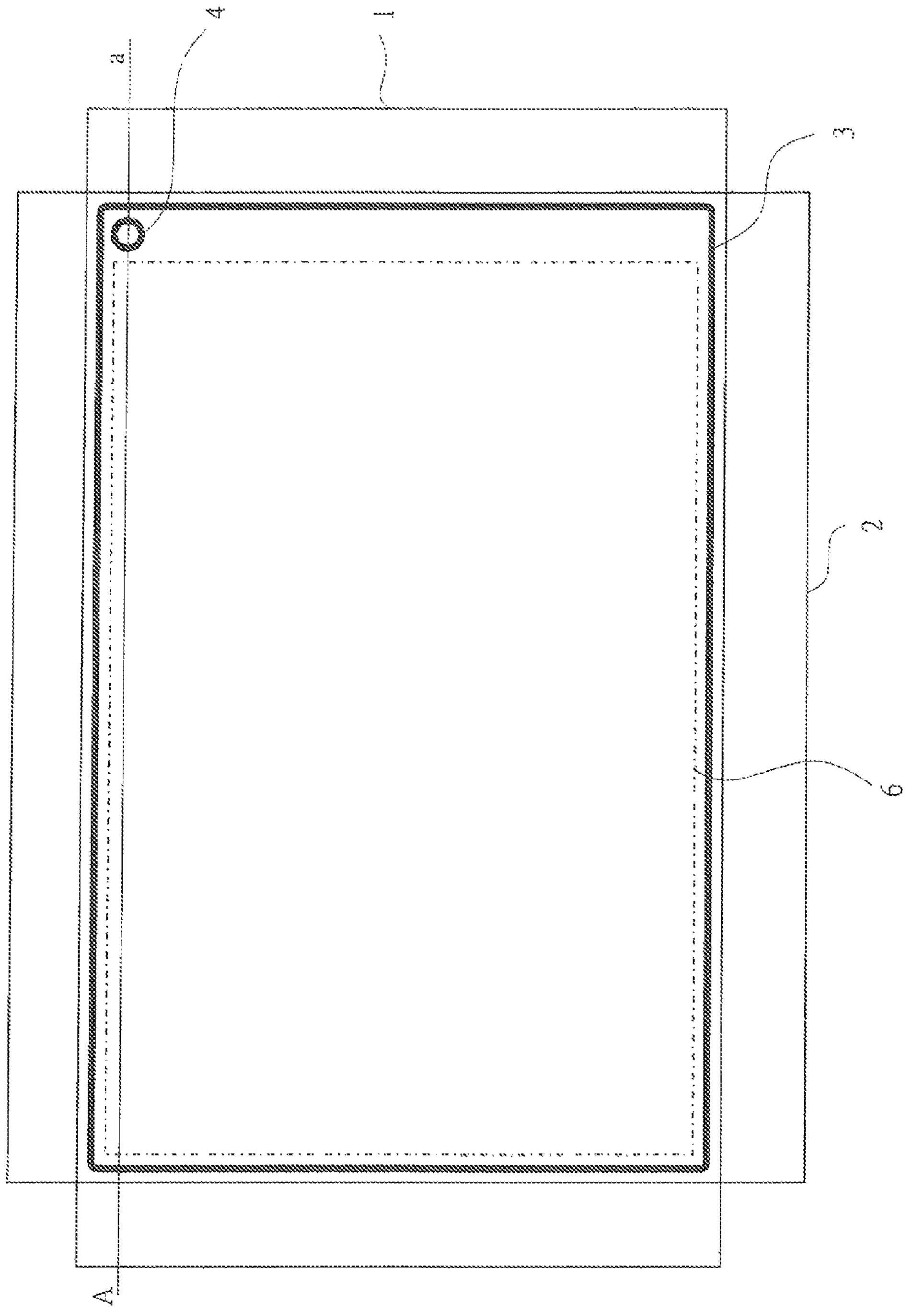
FIG. 1 is a top perspective view of an AC-type PDP using a structure according to a first embodiment of the present invention.
Figure 2:
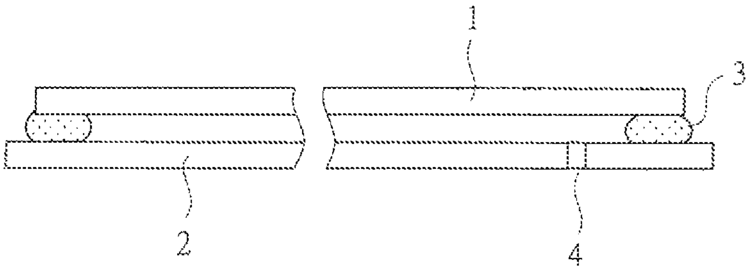
FIG. 2 is a cross-sectional view of the AC-type PDP using the structure according to the first embodiment of the present invention before it is sealed.
Figure 3:
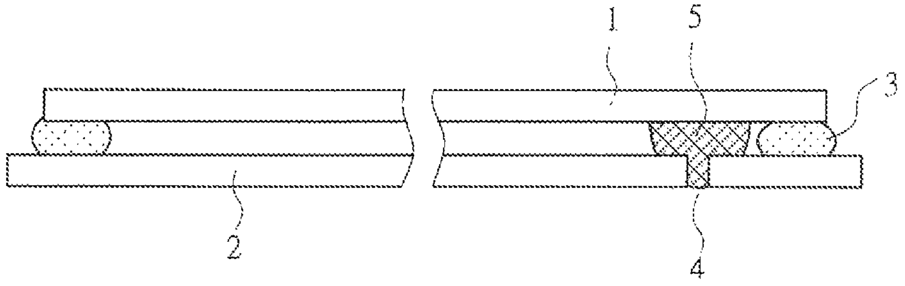
FIG. 3 is a cross-sectional view of the AC-type PDP using the structure according to the first embodiment of the present invention after it is sealed.

FIG. 1 is a top perspective view of an AC-type PDP using a structure according to a first embodiment of the present invention. Further, FIG. 2 is a cross-sectional view of the AC-type PDP using the structure according to the first embodiment of the present invention before it is sealed. The cross-sectional view illustrated in FIG. 2 is a cross-sectional view of the AC-type PDP taken along the line A-a in FIG. 1. FIG. 3 is cross-sectional view of the AC-type PDP using the structure according to the first embodiment of the present invention after it is sealed.

The AC-type PDP is configured to include a front glass substrate 1, a rear glass substrate 2, a seal 3, a gas-filling hole 4, and a plug sealant 5 (shown in FIG. 3).

The front glass substrate 1 is a glass substrate constituting a display screen of a plasma display television set serving as a display device. The front glass substrate 1 is composed of display electrode pairs made of an ITO and metal electrodes, a dielectric layer, a protective layer protecting the dielectric layer, and the like, but since these members are not directly connected with the present invention, illustrations thereof will be omitted.

The rear glass substrate 2 is a glass substrate composed of address electrodes and a dielectric layer, ribs sectioning discharge spaces, phosphors provided between the ribs, and the like. Illustrations of these individual components will be omitted.

The seal 3 is a seal for sealing a space in between the front glass substrate 1 and the rear glass substrate 2 in an air-tight manner. When the seal 3 is viewed from the display surface, it is arranged inside a periphery of a portion where the front glass substrate 1 and the rear glass substrate 2 are overlapped.

The gas filling hole 4 is a hole provided in the front glass substrate 1 or the rear glass substrate 2 in advance. After the front glass substrate 1 and the rear glass substrate 2 are sealed with the seal 3, a discharge gas is filled into the PDP via the gas filling hole 4.

This gas filling hole 4 is a hole positioned in a region between the front glass substrate 1 and the rear glass substrate 2 sealed with the seal 3. However, since structures such as the ribs or the like are present in a display area 6, the gas filling hole 4 is present in a portion surrounding the display area 6.

The plug sealant 5 illustrated in FIG. 3 is an alloy (solder) using one kind of metal or two or more kinds of metals for sealing the discharge gas filled into the PDP.

Next, a manufacturing process of this PDP will be described. Incidentally, since sealing the space in between the front glass substrate 1 and the rear glass substrate 2 with the seal 3 has been performed in the conventional manner, descriptions of the process for the sealing will be omitted. However, such a configuration can be used that a mechanism for the sealing is installed in a chamber main body 100 illustrated in FIG. 4 and the sealing is performed in the same chamber.

The PDP where the space between the front glass substrate 1 and the rear glass substrate 2 has been sealed with the seal 3 (where sealing has not been performed by using the plug sealant 5) is installed in a chamber provided with 1) a mechanism for vacuum, 2) a mechanism for filling discharge gas, and 3) a mechanism for sealing a gas filling hole 4 by using an ultrasonic soldering iron.

Figure 4:
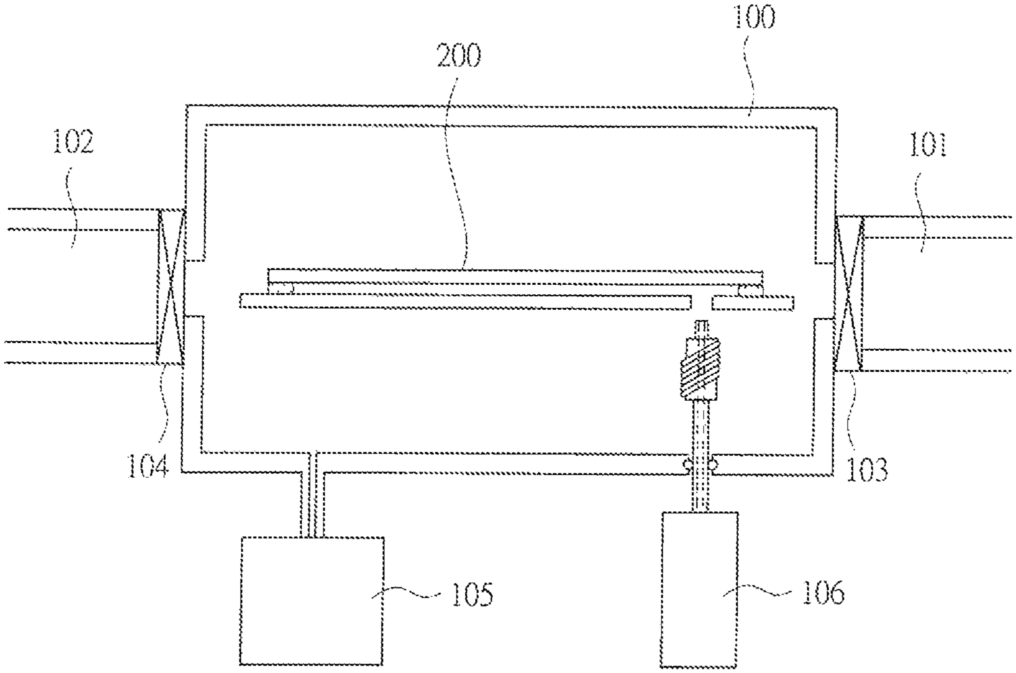
FIG. 4 is a conceptual diagram illustrating a structure of a chamber related to the present invention.

FIG. 4 is a conceptual diagram showing a structure of a chamber according to the present invention.

As described above, a PDP 200 in which a space between the front glass substrate 1 and the rear glass substrate 2 has been sealed with the seal 3 is placed in the chamber.

The chamber is composed of a chamber main body 100, load lock chambers 101 and 102, gate valves 103 and 104, a mechanism for discharging and filling/recovering discharge gas 105, and a mechanism for lifting solder iron up and down and supplying solder 106. Incidentally, in this figure (FIG. 4), a mechanism for introducing the PDP 200 into the chamber and a mechanism holding the PDP 200 inside the chamber, a mechanism for heating the glass substrates of the PDP 200, a mechanism for controlling gas pressure inside the chamber so as to reach a desired pressure when the temperature is returned to ordinary temperature, and the like are omitted. As these mechanisms may be generally used methods.

The load lock chambers 101 and 102 are apparatuses for inserting and removing the PDP into and from the chamber without introducing the atmosphere into the chamber while maintaining vacuum in the chamber upon installing the PDP.

The gate valves 103 and 104 are valve mechanisms for performing insertion and removal of the PDP to and from the chamber main body 100 after the load lock chambers 101 and 102 have been put in a vacuum state.

The mechanism for discharging and filling/recovering discharge gas 105 is a pump for performing gas-exhausting (vacuuming) in the chamber main body 100, filling of a discharge gas into the chamber after the vacuuming is finished, and recovery of the discharge gas after fixation of the plug sealant 5, and the like.

The mechanism for lifting solder iron up and down and supplying solder 106 is a driving part for performing lifting up and down (Z axis) of the ultrasonic soldering iron 8, supplying of a solder, and the like. As long as airtightness can be maintained, a fine-adjustment mechanism (X and Y axes) for the ultrasonic soldering iron 8 may be provided.

Next, a process performed in the chamber will be described. A worker forms the seal 3 on a periphery of a panel using a sealing glass to achieve airtightness and heats the same up to a temperature of about 350° C. to perform an activation processing of a protective film in a sealing chamber (not shown) coupled to the load lock chamber 101. When a low-melting glass is used as a material of the seal 3, the heating is performed up to a temperature of about 450° C.

The worker introduces the PDP 200 into the chamber main body 100 via the load lock chamber 101 after the PDP 200 is cooled.

After fixing the PDP 200, the worker vacuums the chamber using the mechanism for discharging and filling/recovering discharge gas 105 such that the degree of vacuum inside the chamber reaches a desired degree of vacuum ($1.0\times10^{-5}$ Pa or less in this embodiment). Thereafter, the worker introduces a discharge gas into the chamber such that the pressure within the chamber reaches a desired pressure (500 Torr in this embodiment).

Figure 5:
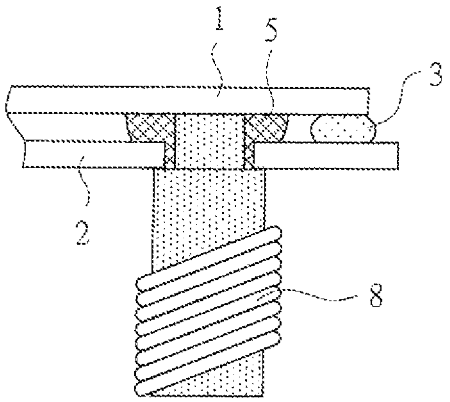
FIG. 5 is a diagram illustrating one example of a solder introducing method in the first embodiment of the present invention.

Thereafter, the worker moves the ultrasonic soldering iron 8 up to a position at which a tip of the ultrasonic soldering iron 8 enters the gas filling hole 4 using the mechanism for lifting solder iron up and down and supplying solder 106. FIG. 5 is a diagram illustrating one example of an introducing method of a solder in the first embodiment of the present invention.

In a method used in this embodiment, an ultrasonic soldering iron 8 having a diameter smaller than a diameter of the gas filling hole 4 is prepared in the chamber. By melting the solder so as to insert the ultrasonic soldering iron 8 into the gas filling hole 4, bonding strength can be made higher than that obtained when an ultrasonic soldering iron having a flat tip is pressed on an outside of the rear glass substrate 2.

When the amount of the solder introduced into the gas filling hole 4 is increased, the melted solder reaches a portion of the front glass substrate 1 opposed to the gas filling hole 4, as shown in FIG. 3, and when the solder is further provided, the solder spreads between the front glass substrate 1 and the rear glass substrate 2 at the periphery of the gas filling hole 4. By adjusting the supplying amount of this solder, it is made possible to perform sealing without causing protrusion of a plug sealant 5 from an exposed surface of the rear glass substrate 2.

In this embodiment, the tip of the soldering iron 8 is heated up to a temperature of about 250° C. at which the solder melts. The solder which has been adjusted so as to melt at a temperature of about 180° C. by adjusting the amount of indium (In) in an In—Pb—In (indium-tin-lead) solder is supplied to the gas filling hole 4 by a desired amount from the tip of the soldering iron 8 by the mechanism for lifting solder iron up and down and supplying solder 106. At this time, an ultrasonic wave of 60 KHz and 10 W is provided together with supply of the solder. The solder is solidified so that the plug sealant 5 is formed in this manner.

Incidentally, the sealing temperature of the seal 3 ranges from 350° C. to 450° C. according to a material to be used, as described above. Though the temperature for forming the plug sealant 5 is set at a temperature of 180° C. in the above embodiment, a solidifying/melting temperature of the solder for forming the plug sealant 5 is adjusted to be less than or equal to the sealing temperature of the material of the seal 3 or be less than or equal to an activating temperature of the protective film. Further, while it is desirable to perform adjustment of the temperature so as not to cause breaking of the glass substrates even if the glass substrates are not heated, the heating may be performed so as not to cause breaking of the glass substrates.

When a series of processes for supplying the solder and forming the plug sealant 5 are finished, the solder iron 8 is moved away from the PDP 200 by the mechanism for lifting solder iron up and down and supplying solder 106. Incidentally, after the solder is solidified, insertion and retreat of the ultrasonic soldering iron 8 becomes impossible, and it is therefore necessary to consider a right time to retreat the ultrasonic soldering iron 8 in the process design.

After the solder is solidified, the discharge gas inside the chamber main body 100 is recovered by using the mechanism for discharging and filling/recovering discharge gas 105.

Thereafter, the PDP 200 is taken out via the load lock chamber 102. Incidentally, two sets of the load lock chamber and the gate valve are prepared for the chamber for convenience of the manufacturing line, but even if only one set is prepared, there is no practical problem.

In the above-described manner, it is possible to achieve thinning down of the PDP to about the panel thickness, which is the object of the present invention.

Incidentally, it goes without saying that such a condition not to exert an adverse effect such as short-circuiting on the sustain electrode pairs on the front glass substrate 1 and the address electrodes on the rear glass substrate 2 is included in conditions of selecting the solder to be used as the plug sealant 5.

Figure 6:
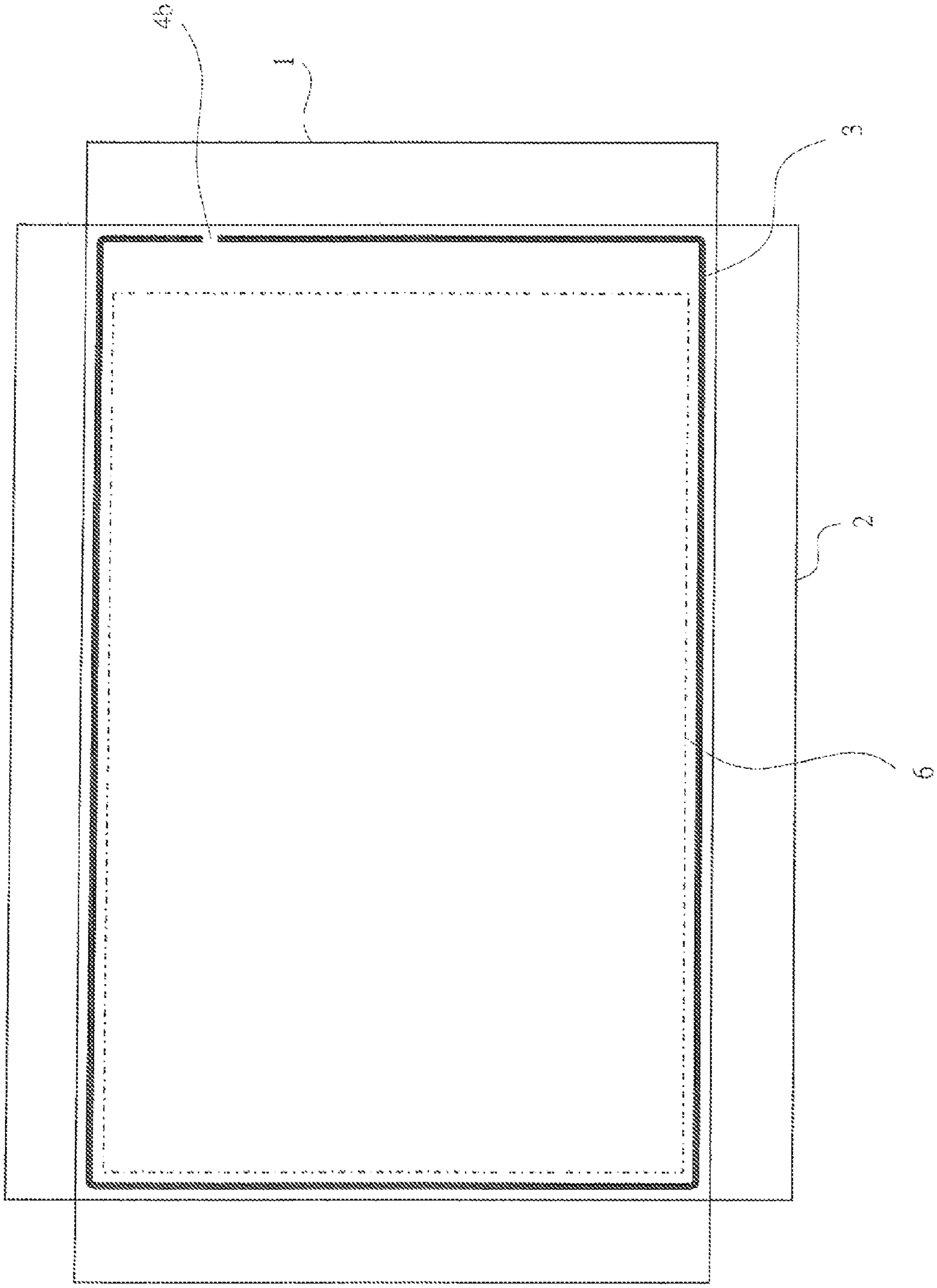
FIG. 6 is a top perspective view of another AC-type PDP using the structure according to the first embodiment of the present invention.

In the above descriptions, vacuuming or the like is performed by using the gas filling hole 4 provided in the rear glass substrate 2. However, the present invention is not limited to this configuration. Since a portion protruded from the glass substrate does not exist according to the present invention, the gas filling hole 4 may be provided in the front glass substrate 1. Further, FIG. 6 is a top perspective view of another AC-type PDP using the structure according to the first embodiment of the present invention. In FIG. 6, a cut portion **4*b* is provided to the seal 3 instead of the gas filling hole 4. Such a configuration can be adopted that vacuuming or the like is performed from the cut portion 4*b*** and supply of solder is performed.

Further, the front glass substrate 1 and the rear glass substrate 2 are not limited to products made of glass. Another material may be used as long as it can maintain the function of sealing a discharge gas. Further, the front glass substrate 1 must satisfy the condition that it has optical transparency so as to be displayable, while the rear glass substrate 2 must satisfy the condition that it has enough structural strength, but any material which will be used in the future can be used to the present invention.

Further, the example that a solder is used as the plug sealant 5 has been described above. However, the present invention is not limited to this material. The plug sealant 5 can be formed of another material which can be applied to join the front glass substrate 1 and the rear glass substrate 2, as long as it has airtightness.

Moreover, in the first embodiment described above, it has been assumed that, when filling of a solder as the material for the plug sealant 5 is assumed to be performed so as to make the solder come in contact with both the front glass substrate 1 and the rear glass substrate 2. However, such a configuration can be used that only the gas filling hole 4 is closed, that is, the solder does not reach the front glass substrate 1.

Second Embodiment

Next, a second embodiment of the present invention will be described with reference to the attached drawings.

In the first embodiment, there has not been any restraint on post-supply of the solder supplied to the gas filling hole 4. Therefore, when adjustment of the supplied amount of the solder is unsuccessful, there is a possibility that the solder flows into structural bodies related to the display area 6 (the ribs on the rear glass substrate 2 or the like).

In the second embodiment, a configuration to prevent such a problem from occurring will be proposed.

Figure 7:
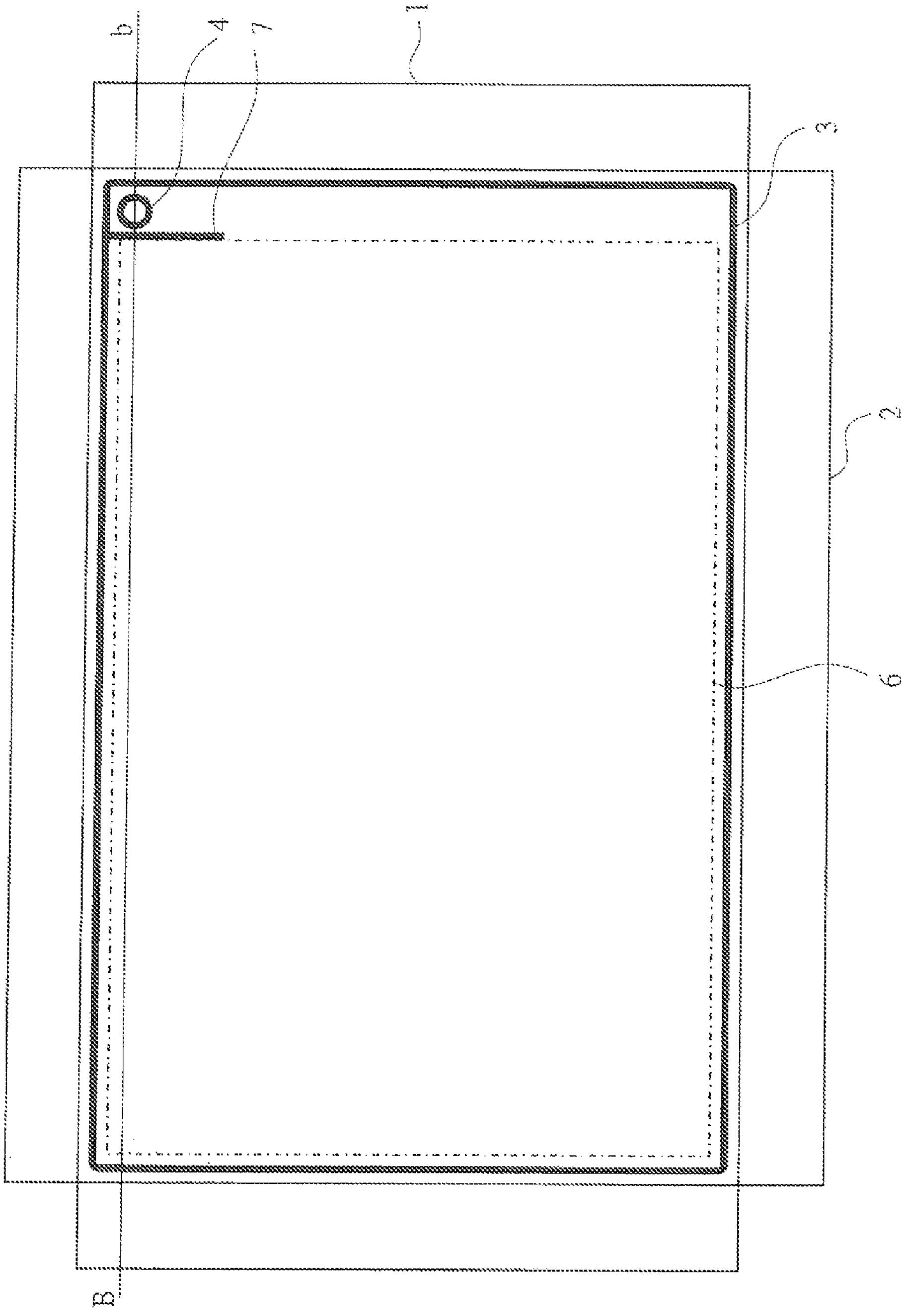
FIG. 7 is a top perspective view of an AC-type PDP using a structure according to a second embodiment of the present invention.
Figure 8A:
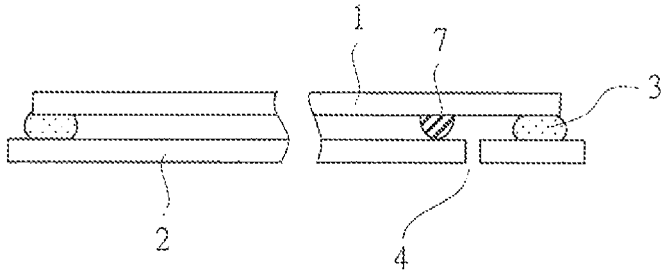
FIG. 8A is a cross-sectional view of an AC-type PDP using the structure related to the present invention before it is sealed.
Figure 8B:
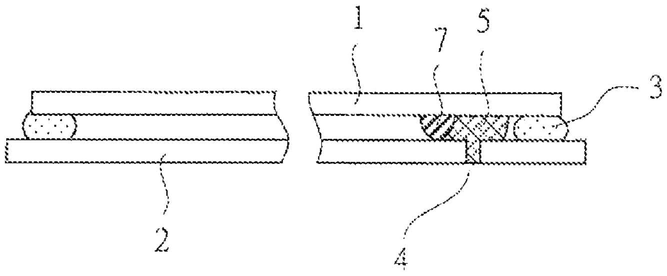
FIG. 8B is the AC-type PDP using a structure related to the present invention after it is sealed.
Figure 9:
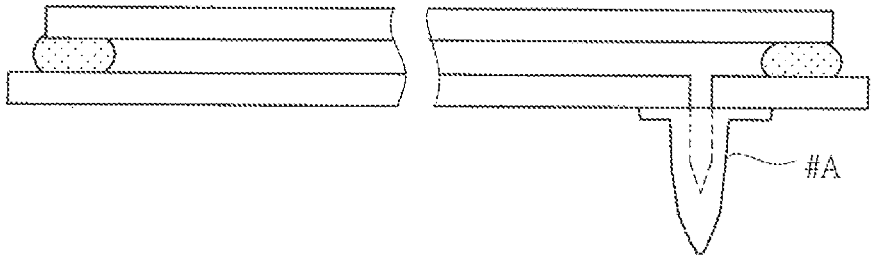
FIG. 9 is a cross-sectional view illustrating a structure of a conventional AC-type PDP.

FIG. 7 is a top perspective view of an AC-type PDP using a structure according to the second embodiment of the present invention. Further, FIG. 8A is a cross-sectional view of the AC-type PDP using the structure related to the present invention before it is sealed. FIG. 8B is a cross-sectional view of the AC-type PDP using the structure related to the present invention after it has been sealed.

As viewed in FIG. 7, a bank 7 having a height smaller than or equal to a height of the ribs (not shown) provided on the rear glass substrate 2 is formed in advance in the vicinity of the display area 6 in this embodiment.

In the second embodiment, the bank 7 is provided on the front glass substrate 1 (see FIG. 8A). However, the bank 7 may be provided on the rear glass substrate 2 simultaneously with configuring the ribs (not shown) of the rear glass substrate 2. Further, the bank 7 may be formed by using the material for the seal 3 simultaneously with forming the seal 3.

In this manner, it is possible to stop spreading of the solder or applying a restraint on spreading the solder in a predetermined direction (see FIG. 8B).

Incidentally, while the bank 7 is linearly placed between the gas filling hole 4 and the display area 6 in the second embodiment, the present invention is not limited to this configuration. For example, the bank 7 may be disposed so as to surround the gas filling hole 4.

In the foregoing, the manufacture of the plasma display panel has been described. However, the present invention is not limited to this, and it can be applied to a display device which requires vacuum airtight structure, for example, an organic electroluminescence display (ELD, OLED) which requires sealing.

What is claimed is:

1. A plasma display panel comprising a front glass substrate and a rear glass substrate, delimiting a space between the front glass substrate and the rear glass substrate which is air tightly sealed by a seal extending along a periphery of the front glass substrate and the rear glass substrate, and having a discharge gas sealed in the space between the front glass substrate and the rear glass substrate, the plasma display panel having a display area within the area sealed by the seal;

wherein the seal has an opening therethrough for introducing the discharge gas through the opening into the space between the front glass substrate and the rear glass substrate;

wherein after introducing the discharge gas through the opening in the seal, the opening in the seal is sealed by a plug sealant for preventing entry of atmosphere through the plug sealant which seals the opening in the seal; and wherein a bank is formed between the seal and the display area at least in a region of the opening in the seal which is plugged by the plug sealant for preventing leakage of the plug sealant into the display area of the plasma display panel.

2. The plasma display panel according to claim 1, wherein the plug sealant is a solder and the seal is a sealing glass.

3. The plasma display panel according to claim 1, wherein the bank is formed on one of the front glass substrate and the rear glass substrate so as to extend in substantially parallel to an extension direction of a portion of the seal having the opening therein which is sealed by the plug sealant.

* * * * *